March 18, 1941.  L. G. DANIELS  2,235,287
AUTOMATIC SOFTENER VALVE
Filed April 26, 1937  8 Sheets-Sheet 2

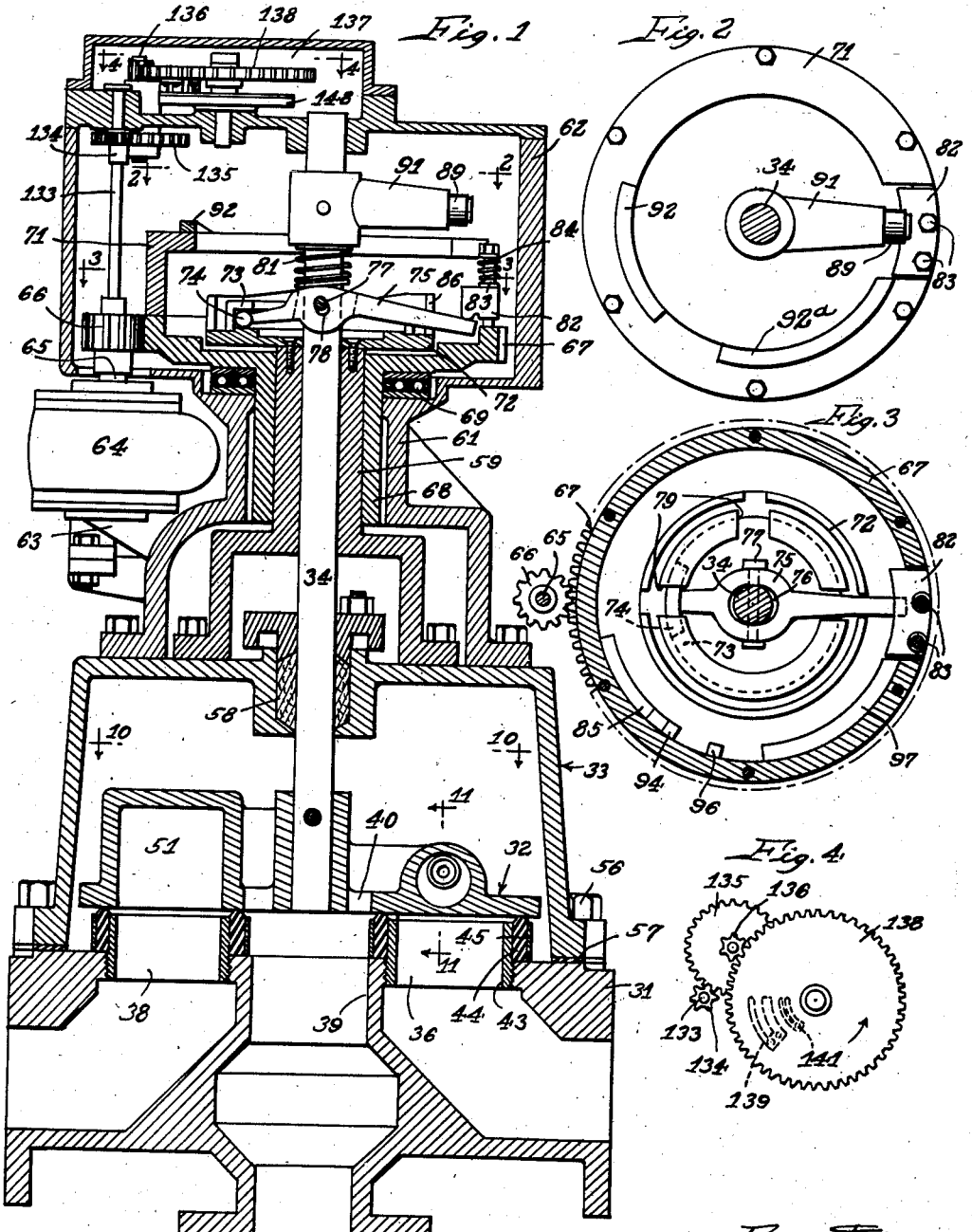

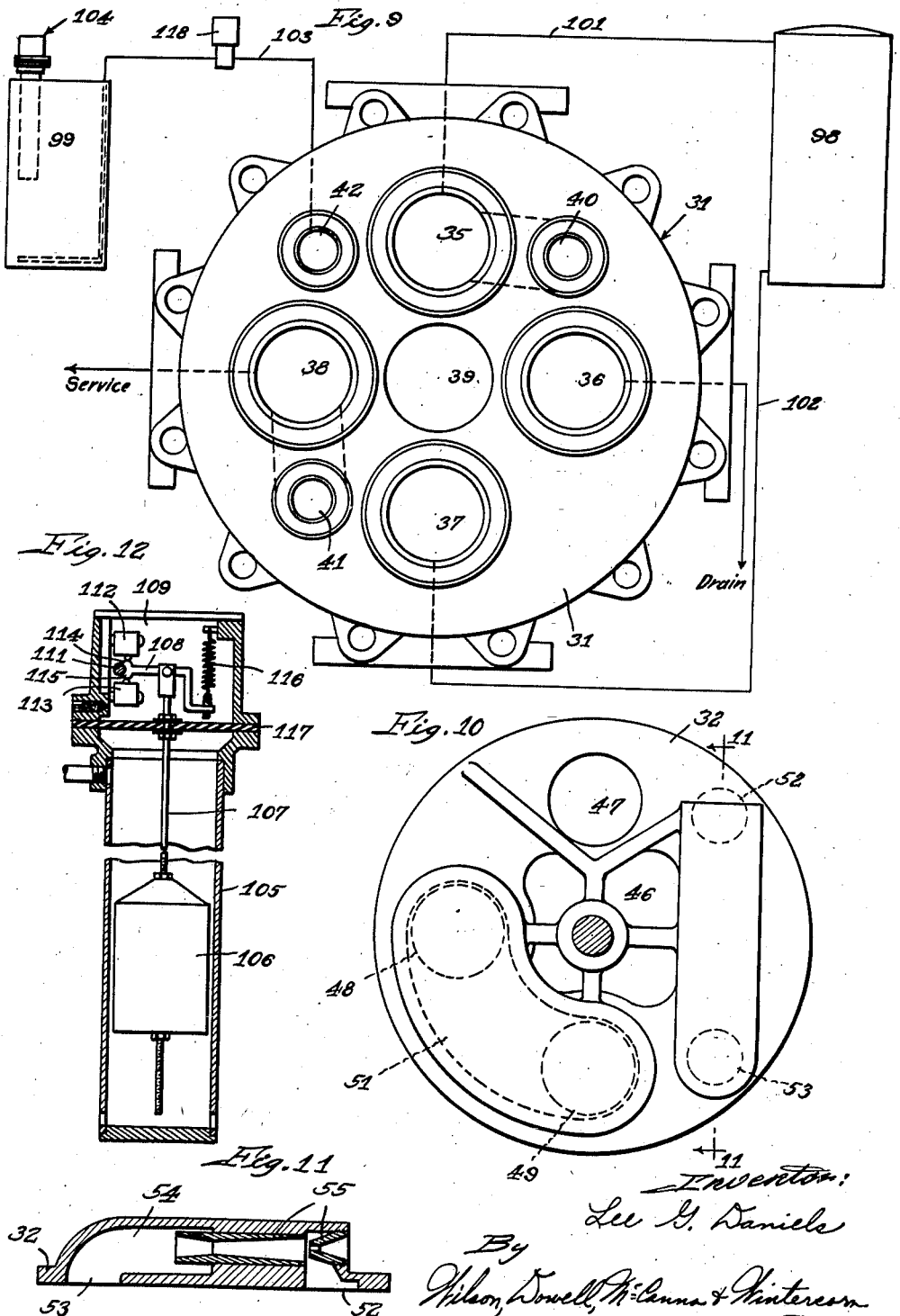

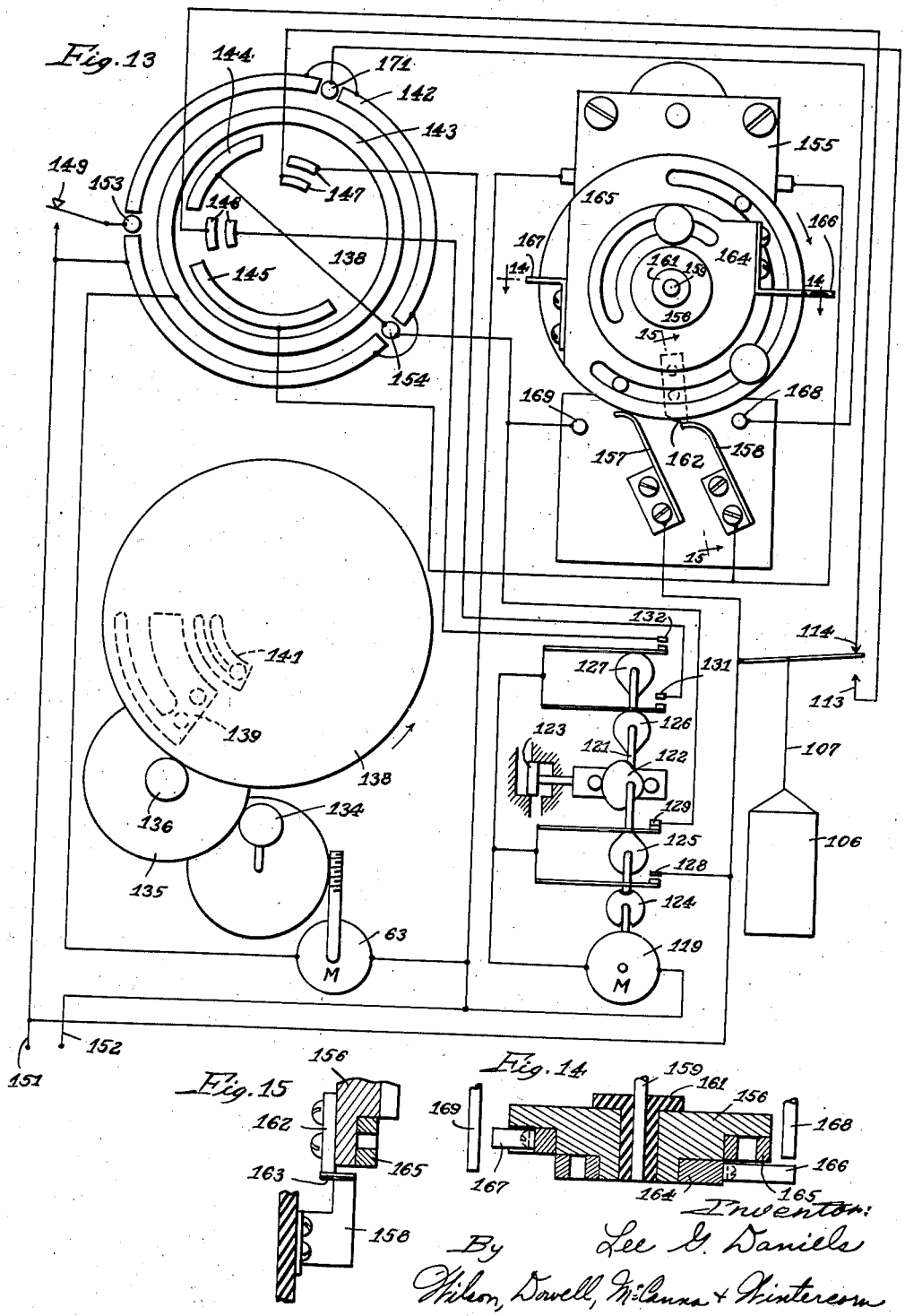

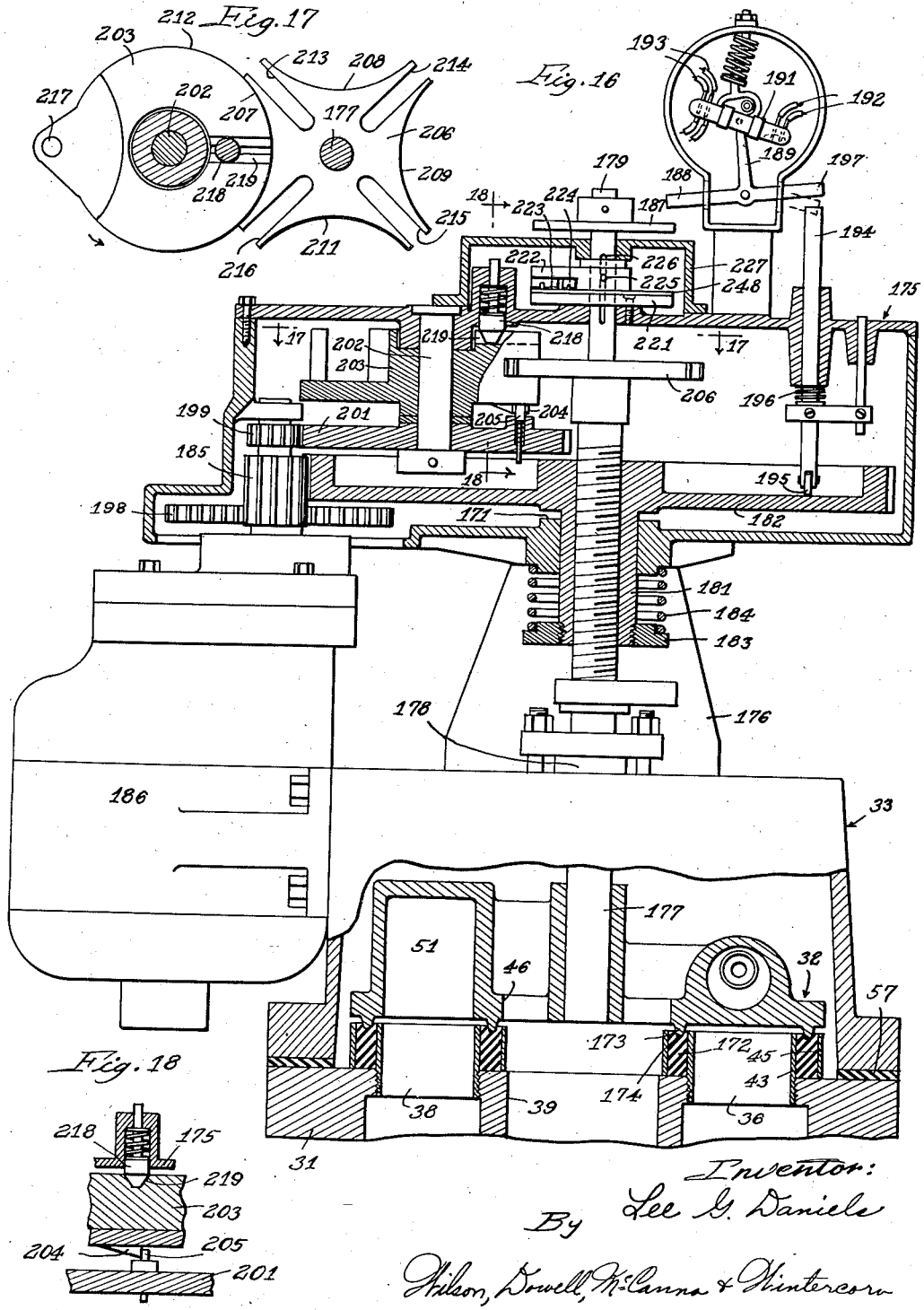

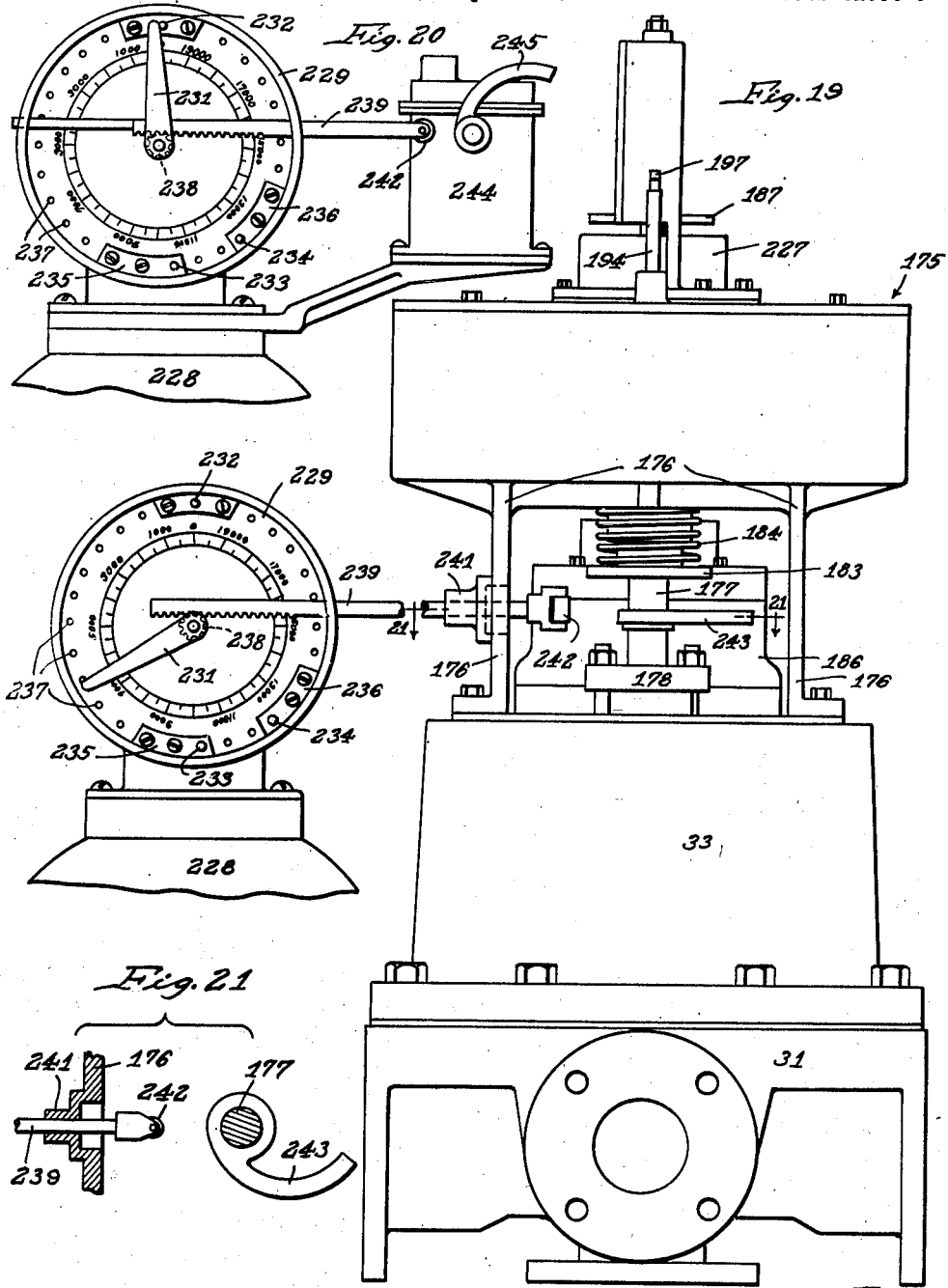

March 18, 1941.   L. G. DANIELS   2,235,287
AUTOMATIC SOFTENER VALVE
Filed April 26, 1937   8 Sheets-Sheet 7

Inventor:
Lee G. Daniels
By
Wilson, Dowell, McCanna & Wintercorn
Attys.

March 18, 1941. L. G. DANIELS 2,235,287
AUTOMATIC SOFTENER VALVE
Filed April 26, 1937 8 Sheets-Sheet 8
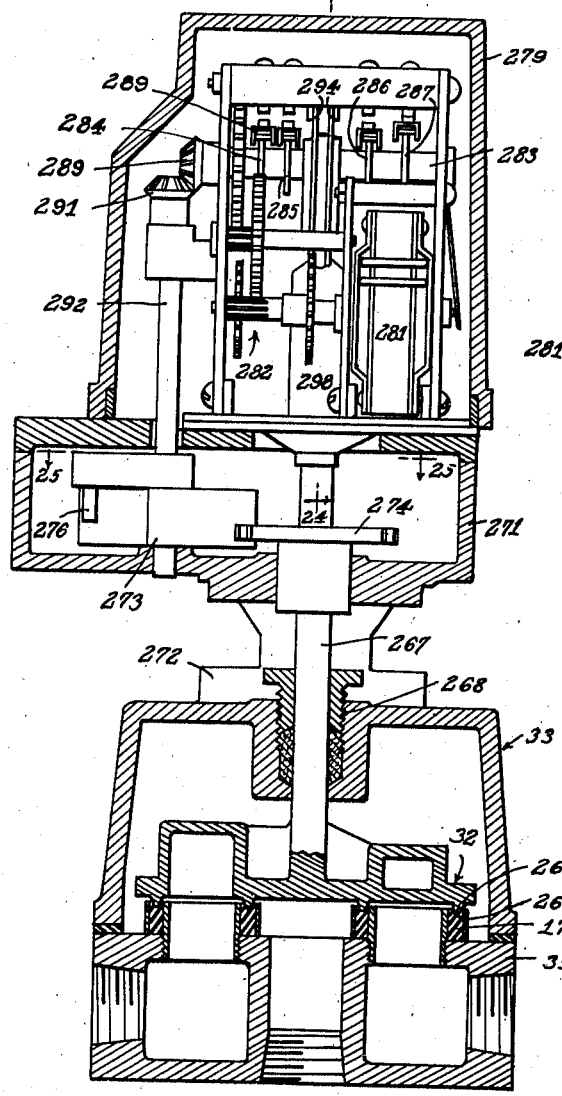
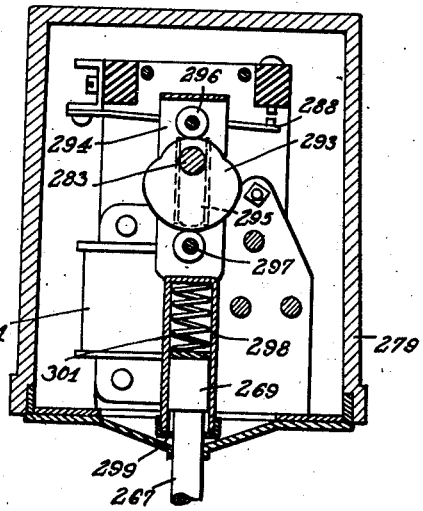
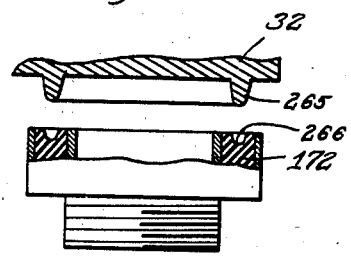
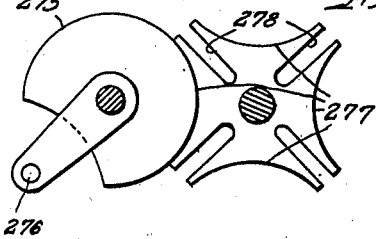
Inventor
Lee G. Daniels
By
Wilson, Dowell, McKenna & Hintereon
Attys.

Patented Mar. 18, 1941

2,235,287

UNITED STATES PATENT OFFICE 2,235,287

AUTOMATIC SOFTENER VALVE

Lee G. Daniels, Rockford, Ill.

Application April 26, 1937, Serial No. 138,948

22 Claims. (Cl. 137—139)

This invention relates to valves, and more particularly to motor operated valves for zeolite water softeners and to means for controlling the same to perform the steps of regeneration.

An important object of the invention is to provide an improved motor operated valve.

A further object is the provision of improved means for driving a multi-ported valve through its cycle of operations.

A further object is the provision of improved means for actuating a valve of the type wherein a rotor member is unseated, turned and reseated, and for releasing and applying seating pressure thereto.

A further object is the provision of improved means for actuating a multiple port type valve wherein a valve rotor member is unseated from its normal operating position, unlocked so as to be free for rotary movement, indexed or moved rotatably to its next position, locked to prevent rotation, and then reseated and held under pressure in this operating position, the valve member being locked against rotation in this operating position.

I have also aimed to provide an improved motor operated valve having improved means for controlling the valve through a cycle of operations. I have further aimed to provide a zeolite water softener having improved valve seat structure to prevent leakage between ports and improved means for controlling the valve to intermittently move the same through a regeneration and softening cycle.

Other objects and advantages will be apparent to those skilled in the art from the following description and the accompanying drawings, in which—

Figure 1 is a section through a motor operated valve embodying my invention;

Fig. 2 is a view on the line 2—2 of Figure 1;

Fig. 3 is a view on the line 3—3 of Figure 1;

Fig. 4 is a view on the line 4—4 of Figure 1; with the supporting portion of the casing cut away to show the gear train;

Fig. 9 is a face view of the valve body member showing diagrammatically the connection of a water softener therewith;

Fig. 10 is a top view of the valve rotor member;

Fig. 11 is a section on the line 11—11 of Fig. 10;

Fig. 12 is a section through the brine level control mechanism;

Fig. 13 is a wiring diagram showing the valve control mechanism;

Fig. 14 is a section on the line 14—14 of Fig. 13;

Fig. 15 is a section on the line 15—15 of Fig. 13;

Fig. 16 is a section through a modified form of motor operated valve embodying my invention;

Fig. 17 is a view on the line 17—17 of Fig. 16;

Fig. 18 is a fragmentary section showing the driving mechanism for the Geneva movement;

Fig. 19 is an elevation of the motor operated valve shown in Fig. 16 showing mechanical means for resetting the meter;

Fig. 20 is an elevation of a portion of the valve control mechanism showing electrical means for re-setting the meter;

Fig. 21 is a section on the line 21—21 of Fig. 19;

Fig. 23 is a section through a further modified form of motor operated valve embodying my invention;

Fig. 24 is a section on the line 24—24 of Fig. 23;

Fig. 25 is a view on the line 25—25 of Fig. 23, and

Fig. 26 is a fragmentary section of the valve seat structure used in Fig. 23.

Figure 5:
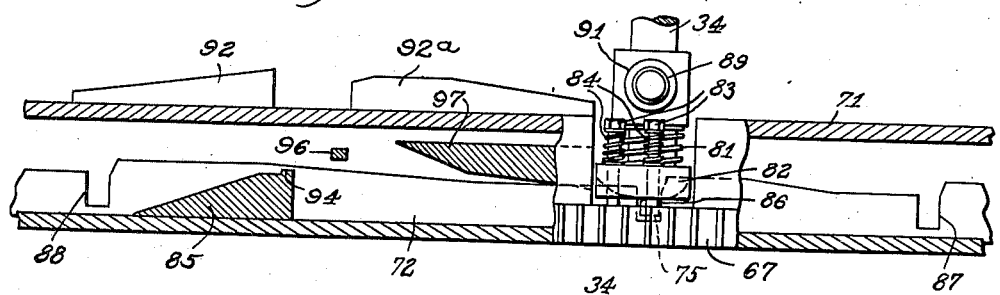
Figs. 5 through 8 are developed views of the cam mechanism showing the parts in various stages of the indexing movement.
Figure 6:
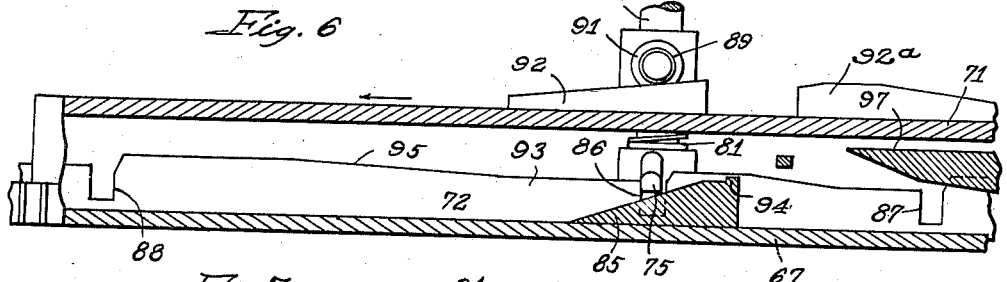

The valve of the present invention is adapted for a multiplicity of uses as will be apparent to those skilled in the art, but has herein been shown and described as used in the control of the flow in a zeolite water softener, such showing being by way of illustration and not limitation. The invention also contemplates a control system for the valve to conduct the steps of regeneration of a zeolite softener and the return to softening.

In Figs. 1 to 15 I have shown an embodiment of the invention adapted for use with a zeolite or base exchange water softener. In Figure 1 the numeral 31 designates the body or stator member of the valve, the numeral 32 designates the rotor member or plate thereof, the numeral 33 designates the valve housing or cover, and the numeral 34 designates the stem by which the rotor or plate member of the valve is raised and indexed between its various positions, the valve herein shown being adapted for use with the stem in horizontal position.

The valve body 31 has a plurality of ports designated by the numerals 35 to 42, respectively, (Fig. 9) extending through the face of the body. Means are provided for sealing the junction between the rotor and body members at each of the ports comprising a sleeve 43, in this instance, threaded into the port and projecting above the face of the body member. Encircling the sleeve 43 is a rubber or other resilient gasket 44 projecting slightly above the upper edge of the sleeve as shown in Figure 1 to provide seats for the rotor member. The gasket is in turn encircled by a retaining member 45 to prevent distortion of the main body of the gasket. The ports 35 and 40 and the ports 38 and 41 are interconnected within the body of the valve as shown in Fig. 9.

The stem plate or rotor member 32 has a central port 46 for communication between the port 39 and the valve chamber formed by the cover 33. The stem plate also has a port 47 for registration with certain of the stator ports, ports 48 and 49 interconnected by a channel 51 and ports 52 and 53 interconnected by a channel 54 (Fig. 11) in which are positioned injector tubes 55 communicating with the valve chamber.

The cover 33 is attached to the stator or body member by means of cap screws 56 spaced around the valve, a gasket 57 being interposed between the cover and body to prevent leakage. A stuffing box 58 is positioned on the face of the cover 33 to prevent leakage along the stem 34. Inner and outer concentric sleeves 59 and 61 are carried on one face of the cover 33, the outer end of the sleeve 61 terminating in a housing 62 enclosing valve actuating mechanism. A driving motor 63 carried on the valve structure is operatively associated with a gear casing 64 through which a shaft 65 is driven, the shaft carrying a pinion 66 meshing with annular teeth on a gear 67, which gear has a hub 68 interposed between sleeves 59 and 61 and is supported for rotation on a bearing 69. Attached to the gear 67 is an annular cam carrier 71 presently to be described. A cam disk 72 is fixedly attached to the upper end of the inner sleeve 59, and on its face has an annular race 73 adapted to retain a transverse end 74 of a valve actuating lever 75, which lever has an opening 76 for the reception of the valve stem 34. The lever and stem are retained within defined limits by a pin 77 which passes through lever openings 78 of a nature such as to permit lost motion movement of the lever 75, as will be apparent from Figure 1. The race 73 is provided with slots 79 to permit the free end of the lever 75 to be depressed below the level of the race (see Fig. 3). A spring 81 tends to urge the lever 75 into the position shown in Figure 1.

Figure 7:
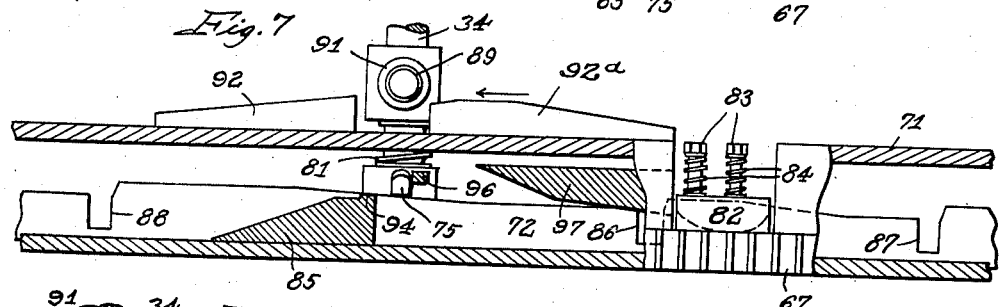
Figure 8:
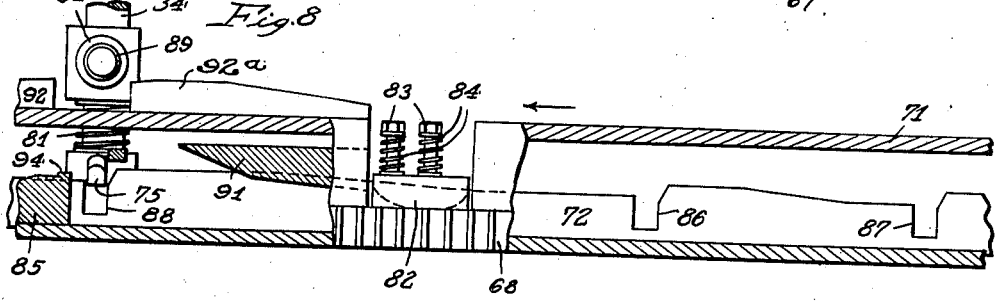

Cam surfaces are provided on the gear 67, cam carrier 71 and cam disk 72 for the purpose of raising the stem 34 to lift the rotor 32 free of its seat, index the rotor to the next succeeding position, and reseat the rotor in such position upon each period of operation of the motor 63, the gear 67 being driven through one complete revolution, plus the degree of rotor movement, in accomplishing this indexing of the valve. This will best be perceived from an examination of Figs. 5 to 8 inclusive. Fig. 5 represents the normal service position of the valve. In this position the rotor is held against the port gaskets 44 by means of the lever 75 acting through a cam 82 carried on bolts 83 adjacent the periphery of the gear 67, the cam being urged downward by means of springs 84. When the motor 63 starts, the gear 67 is rotated to the left facing Figs. 5 to 8, while the cam disk 72 remains stationary. During the initial part of this movement the cam 82 is moved off the free end of the lever 75. The gear 67 continues to rotate until a cam 85 carried thereon moves under the free end of the lever 75 forcing the lever upward out of a notch 86 in the stationary cam disk 72, which notch, together with notches 87 and 88, define the closed positions of the valve. Simultaneously with the engagement of the cam 85 with the lever 75, a roller 89 carried on an arm 91 attached to the stem plate 34 adjacent its upper end is engaged by a cam 92 on the upper side of the cam carrier 71, the cam 92 lifting the stem 34 and rotor 32 until the rotor is free of the port gaskets. As the end of the lever 75 reaches the remote face of the cam 85, it is moved beyond the remote surface of a stationary cam 93 on the cam disk 72 and is moved therealong by rotation of the gear 67 and by contact with a shoulder 94 on the cam 85. Upon continued rotation of the gear 67 the end of the lever 75 is moved free of the shoulder 94 by the sloping portion 95 of the cam 93, as best shown in Fig. 7, and thereupon the gear moves a short distance without corresponding movement of the lever 75 until a pin 96 engages the end of the lever 75, the pin 96 being fixedly carried on the cam carrier 71. The pin 96 moves the lever 75 until the end of the lever drops into the notch 88, as shown in Fig. 8, thus completing the indexing of the valve stem and rotor to the next succeeding angular position. Continued rotation of the gear 67 brings a cam 97 into contact with the end of the lever 75 forcing tne end of the lever downward into the notch 88 and guiding the lever under the spring pressed cam 82, thus bringing the lever and cam into the relative position shown in Fig. 5, through which operations the rotor is moved into seated position against the port gaskets 44 and sufficient pressure applied thereto to properly seal the ports. During the seating of the valve, a cam 92a restrains downward movement of the roller 89 cooperating with the cam 97 to control the reseating of the roller. Where the valve is intended for use with the stem in a vertical position, the cams 92 and 92a may be joined to prevent accidental dropping of the arm 91 and the rotor of its own weight where friction is insufficient to prevent this from occurring. Successive valve operations occur in like manner, the end of the lever 75 being lifted out of one notch and conveyed to the next succeeding notch in a similar manner in response to operation of the motor 63.

In Figs. 9 to 15 I have shown the control mechanism for the valve, in this instance arranged for use with a zeolite or base exchange water softener, though it will be understood that by modifications in the construction in accordance with and carrying forward the teachings herein disclosed, the control mechanism may equally be utilized for filters and liquid distributors. In Fig. 9 the numeral 98 designates the softening tank of a conventional zeolite softener, the numeral 99 a brine tank thereof, the numeral 101 a water line leading from the valve to the softener, the numeral 102 a conduit for soft water flowing from the softener to the valve, and the numeral 103 a line leading from the brine tank to the valve. The port 39 is connected to a source of hard water supply, and the ports 36 and 38 to drain and to service in accordance wtih conventional practice.

Positioned in the brine tank 99 is a brine level control designated generally by the numeral 104 and shown in greater detail in Fig. 12. This consists of a tube 105 suspended in the brine tank and serving as a guide for a float 106 carried on a rod 107 attached to a lever 108 in a switch chamber 109, the lever being articulated at 111 between switches 112 and 113 arranged to be actuated by cams 114 and 115 on the lever in such manner that one of the switches will be actuated when the float reaches the upward limit of its level and the other switch will be actuated when the float reaches its lower limit. A spring 116 cooperates with the lever 108 to counterbalance in part the weight of the float. The rod 107 passes through a diaphragm or plate 117 separating the switch chamber 109 from the float chamber within the tube 105. Actuation of the switches 112 and 113 serves to limit the withdrawal of brine from the brine tank and the subsequent entry of water through the salt bed to replace the brine withdrawn.

Positioned in the brine line 103 is a motor operated valve and contact mechanism indicated generally by the numeral 118 shown diagrammatically in Fig. 13 and including a motor 119 arranged through suitable gearing to drive a shaft 121 having a cam 122 adapted to actuate the movable member 123 of a valve in the line 103 to open and close the same. The shaft 121 also carries cams 124, 125, 126 and 127 adapted to actuate switches 128, 129, 131 and 132 in a manner which will be plain from Fig. 13.

Directing attention now to Figs. 1 and 13, the gear shaft 65 drives a spindle 133 within the valve casing 62, which spindle carries a pinion 134 meshing with a gear 135 fixed to a spindle carrying a pinion 136 within a contact chamber 137 on the valve. The gear 136 drives a gear 138 which in turn carries a pair of wipers 139 and 141, the gear 138 being thus driven at a ratio of one to four with respect to the stem 34. The wipers are positioned to engage contact segments 142, 143, 144, 145, 146 and 147 (Fig. 13) at one or more points during the rotation of the gear 138, the contact segments being carried on an insulation disk 148.

Referring now more particularly to Fig. 13, upon the depression of a push button 149 or other contact mechanism, circuit is established between the power lines 151 and 152 through the switch 149, a contact button 153, brush 139, the contact segment 143 and the motor 63. The push button 149 must be held in contact until the brush 139 engages the contact segment 142, whereupon the motor 63 will run until the brush 139 leaves the segment 142 and engages a contact button 154. During this interval the rotor of the valve will be moved from the service position to its next succeeding position, in this instance, the back-wash position, as heretofore described. Also during this movement of the gear 138 the brush 139 will engage the segment 145 establishing a circuit through a synchronous electric motor 155 so as to drive a timing disk 156, this circuit being established between the contact segments 142 and 145 by means of the brush 139. When the brush 139 strikes the contact point 154, the motor 63 will stop. However, the synchronous motor 155 will continue to rotate, current being supplied thereto through timer brushes 157 and 158, which at this point in the rotation of the timing disk 156 contact the periphery thereof. The disk 156 is of metal or other electrically conductive material supported on the motor shaft 159 through an insulation bushing 161 (Fig. 1½). The synchronous motor 155 will continue to run and drive the disk 156 through a complete revolution or until a cam 162 of insulation material engages a depending finger 163 on the brush 158, raising the brush out of contact with the periphery of the disk 156 and thus breaking the circuit through the timing motor.

The disk 156 carries a pair of annularly adjustable rings 164 and 165, the ring 164 carrying a laterally projecting spring contact member 166, and the ring 165 carrying a similar contact 167, the rings and contact members rotating with the disk and being adjustable thereon to regulate the timing of the various operations, as will presently appear. Contact pins 168 and 169 are positioned so that the pin 169 will be engaged by the contact member 166 during the rotation of the disk, and so that the pin 168 will be engaged by the member 167 as shown in Fig. 14.

When the brush 139 engages the contact point 154, the valve will remain in the position corresponding thereto until the contact member 166 engages the pin 169, whereupon a circuit will be established through the motor 63 by way of the segment 143, the brush 139, the pin 169, the contact member 166 and the brush 157, whereupon the valve will be moved to the next succeeding position, the brush 139 simultaneously moving until it contacts a button 171. Simultaneously with the engagement of the contact member 166 with the pin 169, current is caused to flow through the brine valve motor 119 by way of the contact 129, the pin 169, contact member 166, and brush 157. Upon initial movement of the motor 119, the cam 124 closes the contact 128 and causes the motor 119 to run through a half revolution, at which time the contact 128 will again be opened to stop the motor. This operation causes the brine valve 123 to be opened. When the valve rotor reaches the position represented by contact of the brush 139 with the button 171, rotor ports 52 and 53 are brought into registration with stator ports 42 and 40, respectively, and brine is injected into the softener tank through the line 103, ports 42 and 52, injector tubes 55, channel 54, ports 53 and 40 and line 101. This operation continues until the switch 113 of the brine control 104 is closed by action of the float 106, whereupon a circuit is established through the brine valve motor 119 by way of the contact 131, the contact segments 147, the brush 141, and the switch 113 starting the motor 119, which again runs one-half revolution, thereby closing the brine valve 123. Water then flows from the valve chamber through the injector tubes 55, channel 54 and port 53 to the softener tank for the purpose of washing or rinsing the brine from the softener tank. This wash step continues until the contact member 167 of the timing disk 156 engages the pin 168, whereupon circuit is established through the motor 63 by way of the brush 139, the contact button 171, the pin 168, contact member 167 and brush 157, causing the motor 63 to start and to run until the brush 139 again engages the contact button 153 completing the valve cycle. During the latter movement of the valve, the contact segment 144 is engaged by the brush 139, establishing a circuit through the brine valve motor 119 by way of the brush 139, the segment 144, the contact button 154, the switch 129, and the motor 119, thereby starting the motor 119 and causing the same to rotate through a half turn of the shaft 121 again opening the brine valve 123. The brine valve remains open until the float 106 causes the switch 114 of the brine level control to be closed, whereupon circuit is again established through the brine valve motor 119 by way of the contact segments 146, the brush 141, the switch 131, and the switch 114 again closing the brine valve 123 and completing the regeneration cycle of the mechanism. During the last mentioned period in which the brine valve 123 is opened, water flows into the brine tank 99 for the purpose of replenishing the supply of brine therein.

Directing attention now more particularly to the form shown in Figs. 16 to 22, the valve body or stator, the valve plate or rotor, and the valve cover are substantially the same as in the first form heretofore described, with the exception of the means for sealing the ports. In this instance I have provided a relatively thick cylinder of rubber or similar resilient material 172 having a substantially plain end surface. The rotor 32 is provided with annular rings around the ports as shown at 173 having arcuate lower edges 174 arranged to press into and seal against the outer end of the cylindrical gaskets 172 and be depressed therein, as shown in Fig. 16, under the pressure applied to the rotor by the rotor stem.

A casing, designated generally by the numeral 175, is carried on the end of the cover 33 through brackets 176, and a rotor stem 177 fixed to the rotor 32 projects through a packing gland 178 on the cover 33 and into the casing 175, the remote end 179 thereof of smaller diameter projecting through and beyond the casing 175. The rotor stem 177 is externally threaded for the reception of the internally threaded hub 181 of a gear 182 carried in the casing 175 for rotation and for longitudinal movement. A nut 183 is secured on the remote end of the hub 181 and a coiled spring 184 is interposed between the casing and the nut 183. The gear 182 is adapted to be rotated from a pinion 185 driven by reduction gearing from a motor 186 carried on the cover 33 of the valve. In the position shown in Fig. 16, the spring 184 is acting to exert pressure between the valve rotor and its seat formed by the resilient gaskets 172. However, upon rotation of the gear 182 in one direction, the sleeve 181 and gear 182 will move downward on the stem until the lower face of the gear engages the casing 171, thus releasing the pressure of the spring 184 from the rotor. Upon continued rotation of the gear, the stem will move upward in the sleeve 181, causing the rotor to be lifted free of its seat. The motor 186 is a reversing motor of well known form, and through reversal of the motor by proper changes in the connections of shading coils 180, the gear 182 may be driven in the opposite direction, whereupon the rotor will be brought into contact with its seat and, upon continued rotation the gear 182 and hub 181 will move up along the stem so as to compress the spring 184 and thus apply preloaded pressure on the rotor constantly urging it against its seats.

The pinion gear 185 is of sufficient length to permit of the described axial movement of the gear 182. Through this means the rotor is lifted from its seat, rotated or indexed to its next position, and returned to its seat and pre-loaded pressure applied thereto.

Figure 22:
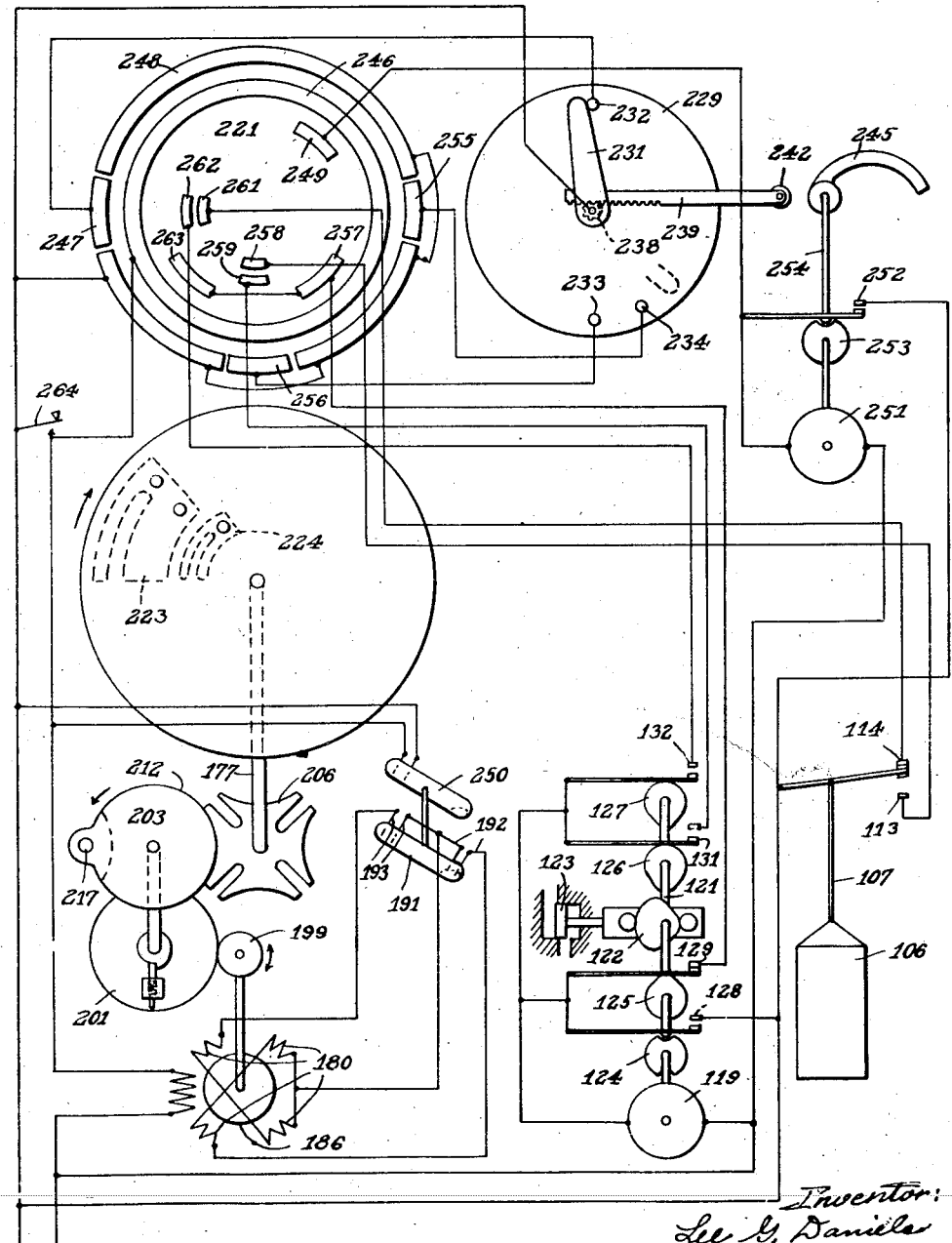
Fig. 22 is a wiring diagram of the modification shown in Figs. 16 to 21.

Reversal of the direction of the motor 186 is accomplished through a disk 187 attached to the upper end of the valve stem and positioned to engage an end 188 of a switch lever 189, thereby shifting the lever into the dotted line position shown in Fig. 16 and tilting a mercury tube 191 so as to break contact with leads 192 and make contacts with leads 193, as will appear from Fig. 22. Operation of the motor 186 in a direction to seat the valve rotor to apply pressure is terminated through action of a push member 194 supported in the casing 175 for longitudinal movement and carrying a follower 195 urged against the face of the gear 182 by a spring 196. Thus as the gear 182 raises in applying pressure between the rotor and its seat, the push member 194 moves upward into contact with an end 197 of the lever 189, shifting the lever into the position shown in full lines in Fig. 16 and tilting the mercury switch 191 to close contacts 192. The motor does not start, however, because the motor is de-energized by means presently to be described.

Means are provided within the casing 175 for indexing the rotor during its movement from the unseated position to the seated position. That is, the valve rotor is first lifted from its seat, then unlocked, then indexed or rotated to its next position, then locked against rotation, and then reseated. This means includes a gear 198 driven from the pinion 185, the gear being carried on a shaft which also carries a pinion 199 which in turn meshes with a gear 201 rotatably carried on a shaft 202. Also carried on the shaft 202 is the driving member 203 of a Geneva movement. The member 203 has a cam 204 on the surface thereof adjacent the gear 201, while the gear carries a spring pressed pin 205 adapted to bear against the surface of the member 203 so that upon rotation of the gear 201 in one direction the pin will ratchet by the cam 204, while upon rotation of the gear 201 in the opposite direction the pin will abut the cam 204 and cause rotation of the member 203.

The second member 206 of the Geneva movement is fixed to the valve stem 177 and cooperates with the driving member 203 to effectuate indexing of the valve stem and rotor member through 90° upon each rotation of the driving member 203. The driven member 206 has the conventional cam surfaces 207, 208, 209 and 211 arranged to cooperate with an arcuate surface 212 on the driving member, and has slots 213, 214, 215 and 216 positioned at 90° angles adapted to cooperate with a pin 217 on the driving member in the usual manner. A spring pressed pin 218 is carried in the casing 175 and urged into a slot 219 of the driving member to prevent rotation thereof, as a result of frictional drag between the gear 201 and the Geneva movement when the gear is rotated in the ratcheting direction. The pin 218 is forced out of its locking slot 219 when pin 205 engages the flat surface of cam 204.

It will thus be seen that as the valve stem 177 is raised through rotation of the gear 182, the gear 201 will move in a direction to ratchet over the cam 204, whereas when the direction of the motor is reversed and the valve stem is moved downward, the pin 205 will engage the cam 204 causing the valve stem and plate to be indexed through 90° during such downward movement. The parts are so arranged that indexing of the rotor occurs substantially at the start of such downward movement. A disk 221 of insulation material is positioned on the outer face of the casing 175 surrounding the stem 177 and carries contact segments presently to be described for the purpose of controlling operation of the valve. Supported adjacent the disk is a brush carrier 222 adapted to carry brushes 223 and 224 in positions to engage the segments on the disk. The carrier is attached to the stem 177 by means of a pin 225 which passes through a slot 226 in the valve stem to permit of longitudinal movement of the stem without disturbing the contacts, but to cause rotation of the brush carrier. The switch mechanism comprising the elements just described is enclosed by a housing 227.

From the foregoing it will be seen that the Geneva movement serves to hold the valve rotor locked against rotation when it is in its normal operating position so that there will be no scoring of the gaskets by relative rotary movement of rotor and stator. The Geneva movement maintains this relationship until the valve rotor has been lifted clear of the stator when indexing. The indexing is performed by the Geneva movement. Upon completion of the indexing operation the valve rotor is locked against rotation from its new position by the Geneva movement.

In Figs. 20 to 22 I have shown means for controlling the valve for moving the same through the steps of regeneration and return to softening as heretofore described. Initiation of the regeneration cycle is brought about through a meter 228 having a dial 229 provided with a hand 231 adapted to rotate in response to operation of the meter and to engage contacts 232, 233 and 234. Contacts 233 and 234 are carried on plates 235 and 236, the plates and contacts being adjustable circumferentially on the dial by engaging the screws thereof in any of a plurality of screw holes 237. Means are provided for setting the position of the hand 231 so that the valve will be set into operation upon passage of a predetermined amount of water through the meter. For this purpose the hand is connected to the meter through any of a plurality of mechanisms such as a frictional means or ratchet mechanism, and is provided with a pinion 238 adapted to engage a rack 239 such that upon movement of the rack toward the left facing Figs. 19 to 22, the hand will be moved in a counterclockwise direction. Two means are shown for moving the rack, that in Fig. 19 being a mechanical arrangement, and that in Fig. 20 electric motor means. Referring first to Fig. 19, the rack 239 is supported for longitudinal movement in a bearing 241 and has a roller 242 at its end adapted for engagement by a cam 243 carried on the valve stem 177, the arrangement of the parts being such that the cam actuates the rack prior to the arrival of the valve rotor in its first operative position corresponding to the back-wash on the softener. The contacts 233 and 234 are positioned so that the hand 231 will be thrown in a counterclockwise direction beyond the position thereof.

Where it is impossible or inconvenient to position the meter in such proximity to the valve mechanism that the rack may be actuated mechanically from the valve, I may employ the arrangement shown in Fig. 20, wherein the numeral 244 designates a motor casing having a cam actuated contact therein, as will presently appear, and driving a cam 245 arranged to engage the roller 242 in the manner heretofore described.

Referring now more particularly to Fig. 22, I have shown means for controlling the valve through the steps of regeneration in a softener system such as shown in Figs. 9 to 12, inclusive. When, during the operation of the softener, the meter-driven hand 231 reaches the button 23., circuit is closed through the field coils of the motor 186 by way of a contact ring 246 on the disk 221, the brush 223, the contact segment 247 with which the brush is in engagement during the service position of the valve, the contact 232, and the hand 231. When the motor has run sufficient to move the brush 223 off the contact segment 247, it engages a contact segment 248, establishing a new circuit through the motor by way of the segment 248 and the ring 246. Upon energization of the motor 186, the valve rotor will be raised and lowered, in the meantime being indexed 90° in a clockwise direction, the brush 223 simultaneously moving 90° around the disk 221. With the softener arrangement herein shown, the motor will not, however, stop at this position and the rotor will immediately be lifted and again indexed an additional 90°. During the second movement of the brush 223, contact is made with a segment 249, thereby closing a circuit through a motor 251 enclosed in the casing 244 by way of the segment 249, the brush 223 and the segment 248. Upon initial movement of the motor 251, a switch 252 is closed by means of a cam 253 on a shaft 254, which is in turn driven through suitable gearing from the motor 251. The switch 252 connects the motor 251 directly to the power supply and keeps the motor running until the cam 245 has made one complete revolution, thereby moving the rack 239 and re-setting the hand 231 to the dotted line position shown in Fig. 22. In the meantime, the brush 223 comes to rest on a contact segment 255. It will be observed that the gears have completed the indexing of the valve stem 177 and rotor prior to the completion of the rotor seating operation, and consequently the brush 223 has moved onto the contact 255 prior to the seating of the valve. In order to continue operation of the motor 186 until the valve has been seated, I provide a mercury switch 250 arranged to be tilted with the mercury switch 191 to supply current to the motor subsequent to the indexing of the valve, the switch being cut off in response to the stem 194 reaching its uppermost position to stop the motor 186 when the valve reaches its seated position. The switch 250 functions in this manner upon each seating movement of the valve, as will be apparent from Figs. 16 to 22.

At this point water from the source of supply flows through the stator port 37 and through the softener tank in a reverse direction accomplishing a back-washing operation. This back-wash is terminated upon the passage of a predetermined amount of water by contact of the hand 231 with the contact button 234 on the face of the meter which closes the circuit through the valve motor 186 by way of the hand 231, the contact 234, the segment 255, the brush 223, and the contact ring 246, whereupon the valve will be indexed an additional 90°, at the close of which movement the brush 223 will come to rest on a segment 256. During this movement of the valve, the brush 223 will momentarily engage a segment 257 closing the circuit through the brine valve motor 119 by way of the contact 129, the segment 257, the brush 223, and the segment 248. As heretofore explained, upon initial movement of the motor 119, the cam 124 closes the switch 128, causing the motor 119 to rotate the shaft 121 through 180° and then stop. This half rotation of the shaft 121 causes the brine valve 123 to be opened so that when the valve rotor reaches its seated position, brine will be drawn from the brine tank 99 through the line 103 in the manner heretofore described. As brine is withdrawn from the tank 99, the float 106 is lowered until the switch 113 is closed, which action serves to terminate the injection of brine into the softener tank by energizing the brine valve motor 119 by way of the switch 131, a segment 159, the brush 224, a segment 258, and the switch 113. This serves to close the brine valve 123. Water then flows through the softener tank from the source of supply by way of the valve chamber, tube 55, the channel 54 and port 53. This flow of water through the meter causes continued movement of the hand 231 until the hand engages the contact button 233, whereupon the circuit through the motor 186 is closed by way of the hand 231, the contact button 233, the segment 256, the brush 223 and the ring 246, as a result of which the valve moves to the service position and the brushes 223 and 224 move to a point at which the brush 223 engages the contact segment 247 and the brush 224 engages contact segments 261 and 262. During this movement of the brushes, the brush 223 engages a segment 263 energizing the brine valve motor 119 by way of the contact 129, the segment 263, the brush 223 and the ring 246, opening the brine valve 123 in the manner heretofore described to permit a flow of water through the pipe 103 into the brine tank 99 to replenish the brine supply. When the level of liquid in the brine tank 99 raises the float 106 to a point closing the contact 114, the brine valve motor 119 is again energized by way of the contact 132, the segment 262, the brush 224, the segment 261, and switch 114, whereupon the motor operates to close the brine valve 123, completing the cycle of operation. The meter hand 231 continues to be driven under the action of the meter as water passes through the softener, and when the hand again makes contact with the button 232 regeneration of the softener will again be initiated. A manually operated switch 264 permits initiation of the cycle at will.

In Figs. 23 to 25, inclusive, I have shown a modified form of motor driven valve adapted to be controlled by mechanism analogous to that heretofore described to cause the valve to move through a regeneration or similar cycle. In this form the stator or body member 31 and the rotor 32 are substantially identical with the form shown in Fig. 16 with the exception that the rotor member has annular rings 265 surrounding each of the ports, which rings are adapted to seat into concave rings 266 formed in the resilient gaskets 172 to seal and prevent leakage between the ports. The gaskets are supported and retained by the confining walls of the inner and outer annular members similar to the members 44 and 45 in the form shown in Figure 1. In this instance a valve stem 267 passes through a stuffing box 268 in the cover 33 and has an annular enlargement or collar 269 at its upper end. An indexing mechanism box 271 is supported on the cover by means of spaced brackets 272 within which a Geneva movement is carried comprising a driving member 273 and a driven member 274 substantially similar to the Geneva members 203 and 206 shown in Fig. 17, the driving member having an arcuate surface 275 and a pin 276, and the driven member having arcuate surfaces 277 and slots 278 positioned at 90° angularity. The driven member 274 is attached to the valve stem 267, whereby upon rotation of the member 273 through one revolution the valve stem will be indexed through 90°.

The box 271 carries a housing 279 enclosing an electric motor 281 arranged through a gear train 282 to drive a cam shaft 283 carrying a plurality of cams 284, 285, 286, and 287 adapted to actuate contacts 288, etc. for the purpose of controlling the motor 281. The shaft 283 carries a bevel gear 289 engaging a bevel gear 291 on a shaft 292 to which the member 273 of the Geneva movement is affixed whereby upon rotation of the cam shaft 283 through a complete revolution, indexing of the valve rotor through 90° is caused to occur.

A cam 293 is carried on the shaft 283 between spaced plates 294, the plates having slots 295 for reception of the shaft 283 and cam followers 296 and 297 adapted to engage the cam 293 whereby upon rotation of the shaft 283 the plates are caused to be reciprocated vertically facing Fig. 24. A sleeve 298 is affixed to the lower end of the plates 294 for the reception of the upper end of the valve stem 267, and has an annular shoulder 299 adapted to abut the lower edge of the collar 269 upon upward movement of the sleeve and thereby lift the valve rotor from its seat. A spring 301 is interposed between the end of the sleeve 298 and the end of the valve stem 267 and functions to apply resilient pre-loaded spring pressure to the upper end of the valve stem when the sleeve 298 occupies its lowermost position to apply loaded seating pressure on the rotor when seated for sealing the ports. The driving parts are so arranged that when the motor 281 is energized the cam shaft 283 rotates, thereby lifting the rotor 32 from its seat. While the rotor is raised from its seat the members 273 and 274 of the Geneva movement function to index the rotor through 90° and the cam 293 then functions to replace the rotor on its seat in the new position thereof. It will be seen that the motor 281 may be manually initiated for starting of the valve cycle, or suitable control mechanism connected with the contacts 288 in conformity with the disclosures heretofore made may be provided for automatically initiating successive periods of operation for the motor in order to carry through a predetermined regeneration cycle.

The foregoing description is given for the purpose of disclosing the invention in such manner as to permit the same to be practiced by others, and the specific forms disclose preferred manners for practicing the invention. I am aware that numerous alterations may be made therein within the spirit of the invention, and I do not wish to be limited except as required by the prior art and the scope of the appended claims, in which—

I claim:

1. In a motor operated valve, having two multiple port members, with resilient gasket means between them, one being a movable member, a motor, and means driven by the motor and acting repeatedly in the same direction upon the movable member for positively driving said movable member through lifting, turning and reseating movements and thereafter applying a yieldable pressure thereon to hold it seated.

2. In a motor operated valve, comprising two multiple port plate type members, one being a movable member adapted to be moved in one direction to different positions in relation to the other member to obtain different flows through certain ports, a motor, and means comprising positive driving connections operating between the motor and the movable member and driven by the motor for gradually and with a controlling motion unseating, turning, reseating the said movable member and applying yieldable pressure thereon after reseating and having positive means for preventing the movable member from any relative lateral movement when being unseated, reseated and when seated.

3. In a motor operated valve, having two multiple port members with resilient gasket means between them, one of the members being adapted to be lifted, turned and reseated, means for applying a yieldable pressure holding said member seated, means for causing first the removal of said yieldable pressure from said member, and thereafter moving said movable member through lifting, turning, and reseating movements, and then applying the yieldable pressure to the said movable member, and a motor for rendering said first mentioned means inoperative and later again rendering the same operative.

4. In a motor operated valve, having two multiple port members with resilient gasket means between them, one of the multiple port members being movable and having a threaded stem shaft, a gear threadedly engaged on said threaded stem shaft, motor means for operating the said gear in one direction for lifting the movable member and in the opposite direction for reseating the movable member and means driven by the motor for turning said movable member during the lifting and reseating movements thereof to bring different ports together.

5. A motor operated valve comprising in combination a multi-ported body member, a ported rotor member rotatable successively in the same direction to different operative positions relative to the body member, a stem extending from the rotor for unseating, turning, and reseating the same, spring means acting on the stem to exert pressure on the rotor to hold the valve seated, and means for moving the valve between successive seated positions including a motor, means between the motor and the stem operative to release said spring pressure, positively drive the rotor to unseated position and subsequently positively drive the rotor to reseated position and thereafter apply the spring pressure thereto, and means for indexing the rotor while the rotor is unseated.

6. A motor operated valve comprising in combination a multi-ported body member, a ported plate type rotor rotatable to different operative positions relative to the body member, a stem extending from the rotor for unseating, turning and reseating the same, a gear concentric with said stem, a motor for rotating said gear, cam means operative in succession between the gear and said stem for successively unseating said rotor, indexing the rotor to its next position and reseating the same, and spring means on said gear for exerting pressure on the stem solely in the seated position thereof to hold the rotor seated.

7. A motor operated valve comprising in combination a multi-ported body member, a ported rotor rotatable to different operative positions relative to the body member, a stem extending from the rotor for unseating, turning and reseating the same, a gear concentric with said stem, a motor for rotating said gear, a lever operative between said gear and said stem, and means including stationary and movable cams operative on said lever the movable cams being carried on said gear to operate on said lever successively in response to rotation of said gear for moving the stem longitudinally in unseating and reseating movements and rotating the stem while unseated.

8. A motor operated valve comprising in combination a multi-ported body member, a ported rotor rotatable to different operative positions relative to the body member, a stem extending from the rotor for unseating, turning and reseating the same, a gear concentric with said stem, a motor for rotating said gear, stationary cam means extending annularly of said stem, levers on the stem, and cam means on said gear in operative relation with the levers and said stationary cams arranged in response to rotation of the gear to successively move the stem longitudinally in unseating movement, index said stem, move the stem longitudinally in seating movement and apply a seating pressure thereto.

9. A motor operated valve comprising in combination a multi-ported body member, a ported rotor rotatable to different operative positions relative to the body member, a stem extending from the rotor for unseating, turning and reseating the same, a gear concentric with said stem and having screw thread engagement therewith, a reversible motor for rotating said gear in either direction to move said stem longitudinally therethrough in unseating and seating movements, means for reversing the direction of said motor when the rotor reaches a predetermined unseated position, and means between the motor and the stem for indexing the latter to its next position while the rotor is unseated.

10. A motor operated valve comprising in combination a multi-ported body member, a ported rotor rotatable to different operative positions relative to the body member, a stem extending from the rotor for unseating, turning and reseating the same, a gear concentric with said stem and having screw thread engagement therewith, spring means acting on said gear for exerting pressure on the stem to hold the rotor seated, a reversible motor for rotating said gear in either direction to move the same on said stem to relieve and apply said spring pressure, means for limiting the movement of said gear longitudinally of the stem to move said stem longitudinally therethrough in unseating and seating movements, means for reversing the direction of said motor when the rotor reaches the unseated position, and a Geneva movement positioned between the motor and the stem for indexing the latter to the next succeeding position while the rotor is unseated.

11. A motor operated valve comprising in combination a multi-ported body member, a ported rotor rotatable to different operative positions relative to the body member, a stem extending from the rotor for unseating, turning and reseating the same, a gear concentric with said stem and having screw thread engagement therewith, a reversible motor for rotating said gear in either direction to move said stem longitudinally therethrough in unseating and seating movements, means for reversing the direction of said motor when the rotor reaches a predetermined unseated position, spring means acting on said gear for exerting pressure on the stem to hold the rotor seated, and a Geneva movement positioned between the motor and the stem for indexing gear for exerting pressure on the stem to hold motor when the rotor reaches a predetermined unseated position, spring means acting on said dexing the latter to the succeeding angular position while the rotor is unseated.

12. A motor operated valve comprising in combination a multi-ported body member, a ported rotor rotatable to different operative positions relative to the body member, a stem extending from the rotor for unseating, turning and reseating the same, a gear concentric with said stem and having screw thread engagement therewith, spring means acting on said gear for exerting pressure on the stem to hold the rotor seated, a reversible motor for rotating said gear in either direction to move the same on said stem to relieve and apply said spring pressure, means for limiting the movement of said gear longitudinally of the stem to move said stem longitudinally therethrough in unseating and seating movements, means for reversing the direction of said motor when the rotor reaches the unseated position, and a Geneva movement positioned between the motor and the stem for indexing the latter to the succeeding position while the rotor is unseated, switch means for controlling the direction of said motor, means for actuating said switch in response to movement of the rotor to the said unseated position to reverse the direction of the motor and reseat the rotor, means for actuating said switch in response to movement of said gear in applying seating pressure to the rotor to reverse the direction of said motor, and switch means for terminating the operation of the motor when the rotor is reseated.

13. A motor operated valve comprising in combination a multi-ported body member, a ported rotor rotatable to different operative positions relative to the body member, a stem extending from the rotor for unseating, turning and reseating the same, a motor, cam means driven by the motor and engaging said stem for unseating and seating said rotor, and a Geneva movement driven by said motor for indexing said rotor to the next succeeding position of the rotor while the rotor is unseated.

14. A motor operated valve comprising in combination a multi-ported body member, a ported rotor rotatable to different operative positions relative to the body member, a stem extending from the rotor for unseating, turning and reseating the same, a motor, a cam driven by said motor, means intermediate said cam and said stem for moving the stem to unseat the rotor during a part of the rotation of said cam and to move the stem to reseat the rotor during a subsequent part of said rotation, and a Geneva movement driven by said motor in timed relation to said cam to index said rotor to the next succeeding position of the rotor while the rotor is unseated.

15. A motor operated valve comprising in combination a multi-ported body member, a ported rotor rotatable to different operative positions relative to the body member, a stem extending from the rotor for unseating, turning and reseating the same, a motor, a cam driven by said motor, sleeve means receiving said stem, spring means acting between the sleeve and the end of the stem for exerting a pressure against the stem to seat the rotor, means on the sleeve and the stem adapted for mutual engagement upon movement of the sleeve to relieve the pressure on said stem, and a cam follower on said sleeve for moving the latter to relieve the pressure on said stem and subsequently move said stem to unseat said rotor during a part of the rotation of said cam and to move the sleeve to seat said rotor and subsequently apply pressure to said stem during a later part of said rotation, and gear means driven by said motor in timed relation to said cam to index said stem to the next position while the rotor is unseated.

16. In a motor operated valve, two multiple port plate type valve members with a resilient gasket means therebetween, a stem attached to one of said members, a motor, and means driven by the motor including spring means acting on said stem for applying a resilient pressure to said member, and cam means operative in succession on said stem for first removing the pressure of said spring means from said stem, then acting on said stem to positively lift, turn and reseat said movable member, and thereafter re-apply said spring pressure to said stem.

17. A motor operated valve comprising in combination a stationary multiple port plate type body member, a ported plate type rotor rotatable to different operative positions relative to the body member, a cover on the stationary member enclosing the rotor, a stem projecting from the rotor through said cover, a sleeve fixed to said cover and enclosing said stem, one end of said sleeve having a plurality of cam surfaces concentric with said stem, a gear mounted for rotation on said sleeve, said gear having annular cam surfaces and a pressure applying spring member, a motor for rotating said gear, a lever pivotally disposed on said stem having ends in cooperative relation with the cam surfaces on said sleeve and on said gear for removing and applying pressure of said spring means to said stem upon rotation of said gear and for rotating said stem to rotate the rotor, and a lever attached to said stem shaped to be actuated by the cam means of said gear to move said stem and rotor in unseating and seating movements.

18. In a motor-operated valve, having two multiple port members with resilient gasket means between them, means for moving one of said members through lifting, turning, and reseating movements, comprising operating means attached to said member for imparting said movements thereto, spring means for applying a yieldable pressure to said operating means holding said member seated, and motor-driven means for rendering said spacing means inoperative to remove said yieldable pressure, moving said operating means through lifting, turning, and reseating movements, and thereafter rendering said spring means operative to re-apply said seating pressure to said member.

19. In a motor-operated valve, having two multiple port plate type members with resilient gasket means between them, one of said multiple port members being movable, operating means attached to said movable member for lifting, turning, and reseating said member, a motor, gear means between said operating means and said motor for lifting, turning, and reseating said movable member to bring different ports together, and spring means on said gear for applying pressure to said operating means positioned to be released by movement of said gear means prior to unseating of said member and compressed subsequent to reseating thereof to apply pressure thereto when seated.

20. In a motor-operated valve having two multiple port members and resilient gasket means between them, one of said members being movable, operating means attached to said movable member, motor-operated cam means acting on said operating means for successively lifting said member and reseating the same, a spring for applying pressure through said operating means to hold said member seated, positioned to be released by movement of said cam means prior to unseating of said member and compressed subsequent to reseating thereof, and a motor driven Geneva movement connected to said operating means to release, index and lock said member in successive rotary positions when lifted.

21. A motor-operated valve comprising a multi-ported body member, a ported plate type rotor member rotatable successively in the same direction to different operative positions relative to the body member, and means for driving the rotor member between successive positions comprising a motor, means operated by the motor for moving the rotor with respect to the body member to unseat and seat the same including resilient means for applying pressure to the rotor releasable in response to initial movement of said motor-operated means and compressible in response to final movement thereof, means operated by the motor for rotating the rotor to the next succeeding position while the rotor is unseated, and means for terminating the operation of the motor in response to compressive movement of said motor-driven means.

22. A motor-operated valve comprising in combination a multi-ported body member, a ported rotor rotatable to different operative positions relative to the body member, a stem extending from the rotor for unseating, turning, and reseating the same, a gear concentric with said stem, a motor for rotating said gear, and means including a lever operative between the gear and said stem, spring means positioned on the gear to engage said lever at a predetermined position, and a plurality of cams on said gear operable in succession for unseating said rotor, indexing the rotor to its next position, reseating the same, and subsequently applying seating pressure thereto.

LEE G. DANIELS.

CERTIFICATE OF CORRECTION.

Patent No. 2,235,287.

March 18, 1941.

LEE G. DANIELS.

It is hereby certified that error appears in the printed specification of the above numbered patent requiring correction as follows: Page 7, second column, lines 69 to 73 inclusive, claim 11, for the words "the rotor seated, and a Geneva movement positioned between the motor and the stem for in- gear for exerting pressure on the stem to hold motor when the rotor reaches a predetermined unseated position, spring means acting on said" read --motor when the rotor reaches a predetermined unseated position, spring means acting on said gear for exerting pressure on the stem to hold the rotor seated, and a Geneva movement positioned between the motor and the stem for in- --; page 8, second column, line 47, claim 18, for "spacing" read --spring--; and that the said Letters Patent should be read with this correction therein that the same may conform to the record of the case in the Patent Office.

Signed and sealed this 6th day of May, A. D. 1941.

(Seal)

Henry Van Arsdale,
Acting Commissioner of Patents.